United States Patent [19]

Haus et al.

[11] 3,996,179

[45] Dec. 7, 1976

[54] PRINTING INKS FOR TRANSFER PRINTING

[75] Inventors: Artur Haus, Overath; Theodor Mager; Norbert Pusch, both of Leverkusen; Wilfried Roseler, Junkersdorf, all of Germany

[73] Assignee: Bayer Aktiengesellschaft, Leverkusen, Germany

[22] Filed: Aug. 9, 1974

[21] Appl. No.: 496,181

[30] Foreign Application Priority Data

Oct. 18, 1973 Germany .......................... 2352246

[52] U.S. Cl. ..................... 260/29.6 R; 260/29.6 H; 106/22; 106/23

[51] Int. Cl.² ......................................... C09D 11/02

[58] Field of Search ...... 260/29.6 R, 42.21, 29.6 H; 106/22, 23

[56] References Cited

UNITED STATES PATENTS

| | | | |
|---|---|---|---|
| 2,543,718 | 2/1951 | Cassel | 260/29.6 R |
| 2,762,719 | 9/1956 | Kleiner | 260/29.6 R |
| 2,825,708 | 3/1958 | Auer | 260/29.6 R |
| 3,615,791 | 10/1971 | Thomas | 260/29.6 R |
| 3,647,503 | 3/1972 | Mizutani | 428/305 |
| 3,650,664 | 3/1972 | DeGraff | 260/29.6 H |
| 3,652,313 | 3/1972 | Nagata | 260/42.21 |

FOREIGN PATENTS OR APPLICATIONS

| | | |
|---|---|---|
| 791,747 | 11/1972 | Belgium |
| 1,223,330 | 6/1960 | France |
| 1,575,069 | 7/1969 | France |
| 1,585,119 | 1/1970 | France |

*Primary Examiner*—Paul R. Michl
*Attorney, Agent, or Firm*—Plumley and Tyner

[57] ABSTRACT

The invention relates to aqueous printing inks for the production of printed temporary supports, for transfer printing, by the film printing or screen printing process. The inks contain a sublimable disperse dyestuff, a binder, a filler and a thickener. The binder/filler weight ratio of the inks is 1 : 2 to 1 : 8, preferably 1 : 6 to 1 : 7.

2 Claims, No Drawings

PRINTING INKS FOR TRANSFER PRINTING

The present invention relates to aqueous printing inks for the production of printed temporary supports, for so-called transfer printing, by the film printing screen printing process.

The printing inks according to the invention are characterised in that they contain at least one water-insoluble dyestuff which can be sublimed in the range from 120° to 280° C, preferably 160° to 220° C, a binder, a filler, a thickener and optionally an organic solvent and/or a surface-active agent, the binder/filler weight ratio being 1:2 to 1:8, preferably 1:6 to 1:7.

Suitable dyestuffs are dyestuffs of the most diverse categories usually employed in transfer printing, that is to say preferably dyestuffs of the azo, anthraquinone, quinophthalone and methine series, such as are described, for example, in French Patent Specifications Nos. 1,223,330, 1,575,069, 1,573,698 and 1,585,119 and in Belgian Patent Specification No. 791,747.

Binders which can be used are natural or synthetic physically drying products which are water-soluble (or have been rendered water-soluble by customary saponification processes), such as are normally used for the production of flexographic printing inks and screen printing inks. Examples which may be mentioned are: shellac and homopolymers and copolymers based on vinyl acetate, vinyl alcohol, vinyl chloride, acrylic acid, acrylic esters, methacrylic acid, crotonic acid and/or maleic acid. Polymers described in DOS (German Published Specification) 2,161,909 are particularly suitable.

Fillers which can be used are carbonates, sulphates, silicates, oxides and the like of the alkali metals and alkaline earth metals and of aluminum and titanium, but also heavy metal sulphides and heavy metal oxides. Examples which may be mentioned are: magnesium carbonate, calcium carbonate and barium carbonate; calcium sulphate and barium sulphate; sodium aluminium silicates and potassium aluminium silicates; aluminium oxide, titanium oxide, silicon dioxide and cadmium oxide; zinc sulphide, tin sulphides, lead sulphides and cadmium sulphide and numerous others. Finely divided quartz powder and preferrably natural calcium magnesium carbonates (dolomite) are particularly suitable. Mixtures of these compounds can also be employed.

Especially suitable are fillers with a small surface area and with little tendency to absorb binders, so that in spite of the high filler content a printing ink with good flowing properties is obtained; i.e. inks with a viscosity of 2000 to 3500 cp.

Suitable thickeners are swelling clays, plant kernel flour ethers (such as carob bean flour ether and guar flour derivatives, for example Guaranate) and alginates.

Suitable surface-active agents are non-ionic compounds, such as alkyl polyglycol ethers and alkylphenol polyglycol ethers and anionic compounds such as naphthalenesulphonic acid/ formaldehyde condensates.

Organic solvents which can be used are water-miscible solvents of low odour which are physiologically harmless and relatively high-boiling (compared to water), such as diacetonealcohol, ethyl glycol, diethylene glycol, glycerine and many others.

In general, the printing inks to be used according to the invention have the following composition:
a. Dyestuff: 3–5% (coloured) or 10–15% (black)
b. Binder: 3–10%, preferably 4–6%
c. Filler: 25–50%, preferably 35–40%
d. Thickener: less than 1%
e. Surface-active agent: less than 1%
f. Organic solvent: 0–20%, preferably 5–15%
Remainder: water The percentages quoted are percentages by weight and relate to the pure undiluted solid or liquid components.

The printing inks according to the invention are particularly suitable for the single-colour or multi-colour printing of the temporary supports on rotary film printing or screen printing machines of conventional construction (80–100 mesh sieves) using printing speeds customary in practice — preferably without any intermediate drying.

The multi-colour print is preferably carried out side by side without overlapping.

Possible temporary supports are especially those made of paper, preferably of high absorbency (Cobb value > 80).

A further subject of the invention are the temporary supports printed with the printing inks according to the invention, and their use for printing preferably synthetic substrates by the known transfer printing principle. In this, the temporary supports are brought into intimate contact with the substrate, using a continuous or discontinuous method, after which the colour pattern is "transferred" from the support to the substrate by the action of heat and, if appropriate, of pressure.

Suitable substrates are fleeces, films and above all fabrics of preferably synthetic material, especially consisting of aromatic polyesters, cellulose triacetate (without a so-called S-finish), high molecular polyamides and acrylonitrile polymers; polyester fibre materials are particularly suitable.

It is already known to use aqueous printing inks containing sublimable dyestuffs for the production of printed temporary supports for transfer printing. However, the use of these inks is largely restricted to printing by the gravure printing process or flexographic printing process, which normally does not present any particular problems since in these processes the layers of printing ink are relatively thin, that is to say relatively small amounts of water are used, and furthermore the printing machines used in practice are equipped with drying devices. However, the gravure printing process, which admittedly permits the production of patterns with particularly fine half-tone effects on the temporary support and hence on the material to be printed, has the disadvantage that the production of the etched or engraved gravure printing cylinders is very costly, which has an adverse influence on the economics of the transfer printing process, particularly in the case of the fairly short runs which frequently occur in the textile field. On the other hand, flexographic printing, which is more economical — since it uses inexpensive rubber blocks — cannot fulfil the high standards required with regard to fineness of half-tone effects.

The film printing or screen printing process to be used according to the invention, which combines in itself the advantages of the abovementioned processes — namely fine half-tone effects and an inexpensive printing plate — has on the other hand not been able to find entire acceptace when using the printing inks which have hitherto been customary, since, due to the thickness of the screen material, relatively large amounts of printing ink (and hence amounts of water) are applied and since as a result of the absence of intermediate drying devices in conventional film printing and screen printing machines considerable technical difficulties arise in printing, which one has sought to overcome, for example, by using very absorbent and highly filled papers as temporary supports.

However, this method of working has the disadvantage that relatively large amounts of the dyestuff contained in the printing ink "strike into" (that is to say penetrate into) the paper together with the water and during the subsequent transfer printing process do not pass onto the substrate, that is to say the dyestuff yield is relatively low. In addition, highly filled papers are relatively expensive and have a low tear strength.

The printing inks according to the invention, of high filler content, are now distinguished by the fact that during printing only a little dyestuff penetrates into the paper and that they are also suitable for printing low-ash papers.

Papers of low absorbency (that is to say down to Cobb values of 30) can also be printed with good success, without using intermediate drying.

On transfer printing from the temporary supports printed with the new inks, deep-coloured prints with sharp contours are produced, with high dyestuff yields, on the substrates.

The invention is explained in more detail by means of the following examples:

EXAMPLE 1

A paper of the following specification: 80.0 g/m², 17.1% ash content, Cobb test 88.3 g/m²/45 inches, breaking length (m), dry: machine direction = 4,260, transverse direction = 1,800, is printed on a rotary film printing machine with 80 mesh sieves and without intermediate drying, using a transfer printing ink consisting of:

21.0 parts by weight of water
7.0 parts by weight of diacetone alcohol
41.3 parts by weight of natural Ca-Mg carbonate
0.2 part by weight of sodium hexametaphosphate
0.5 part by weight of naphthalenesulphonic acid/formaldehyde condensation product
8.0 parts by weight of swelling clay, 3% strength
12.0 parts by weight of acrylate binder (water-soluble, 50% strength)
10.0 parts by weight of Disperse Yellow 60 (30% strength) 100.0 parts by weight The dyestuff yield on transfer printing onto a polyester fabric is 76%.

(Viscosity of the yellow printing ink: 3,200 cp, measured by means of the Viscotester VT-02 of Messrs. Gebr. Haake, Berlin).

Comparably good results are obtained on transfer printing onto a polyamide fabric or cellulose triacetate fabric.

EXAMPLE 2

A paper of the following specification: 88.2 g/m², 31.0% ash content, Cobb test 87.5 g/m²/45 inch, breaking length (m) dry: machine direction = 1,910, transverse direction = 1,000, is printed on a rotary film printing machine with 100 mesh sieves and without intermediate drying, using a transfer printing ink consisting of:

21.0 parts by weight of water
7.0 parts by weight of diacetone alcohol
41.3 parts by weight of natural Ca-Mg carbonate
0.7 part by weight of alkylphenol polyglycol ether
8.0 parts by weight of top-grade flour ether, 3% strength
12.0 parts by weight of the ammonium salt of a copolymer of vinyl acetate and crotonic acid (50% strength)
10.0 parts by weight of Disperse Red 60 (30% strength) 100.0 parts by weight Dyestuff yield on transfer printing onto polyester: 81%.

Viscosity of the red printing ink: 2,500 cp, measured as indicated in Example 1.

Comparably good results are also obtained, for example, on cellulose triacetate fabrics and polyacrylonitrile fabrics.

EXAMPLE 3

A paper according to Example 1 is printed on a rotary film printing machine with 100 mesh sieves without intermediate drying, using a transfer printing ink (viscosity 2,800 cp) consisting of 28.0 parts by weight of water
7.0 parts by weight of diacetone alcohol
37.0 parts by weight of natural Ca-Mg carbonate
3.0 parts by weight of Na-Al silicate
0.2 part by weight of sodium hexametaphosphate
0.5 part by weight of alkylphenol polyglycol ether
7.3 parts by weight of Guaranate, 8% strength
7.0 parts by weight of water-soluble shellac
10.0 parts by weight of Disperse Blue 14 (30% strength) 100.0 parts by weight Dyestuff yield on transfer printing onto polyester: 79%.

EXAMPLE 4

A 60 g/m² paper similar to Example 1 but having a Cobb value of only 42.0 g/m²/45 inch is printed on a rotary film printing machine with 100 mesh sieves, without intermediate drying, using a transfer printing ink (viscosity 2,600 cp) which has been ground in a stirred ball mill and consists of 24.0 parts by weight of water
7.0 parts by weight of diacetone alcohol
44.3 parts by weight of natural Ca-Mg carbonate
0.7 part by weight of naphthalenesulphonic acid/formaldehyde condensation product
8.0 parts by weight of swelling clay, 3% strength
12.0 parts by weight of acrylate binder (water-soluble, 50% strength)
4.0 parts by weight of Disperse Violet 1 (100% strength)
100.0 parts by weight Dyestuff yield on transfer printing onto polyester: 80%.

Comparably good results are obtained on transfer printing onto cellulose triacetate.

EXAMPLE 5

A 72 g/m² paper according to Example 1 is printed on a rotary film printing machine with 100 mesh sieves, without intermediate drying, using a black transfer printing ink consisting of 19.0 parts by weight of water
8.0 parts by weight of diacetone alcohol
26.3 parts by weight of natural Ca-Mg carbonate
0.2 part by weight of sodium hexametaphosphate
0.5 part by weight of naphthalenesulphonic acid/formaldehyde condensation product
4.0 parts by weight of swelling clay, 3% strength
12.0 parts by weight of acrylate binder (water-soluble, 50% strength)

13.2 parts by weight of Disperse Yellow 60 (30% strength)

3.1 parts by weight of Disperse Red 60 (30% strength)

13.7 parts by weight of Disperse Blue 14 (30% strength) 100.0 parts by weight

Dyestuff yield on transfer printing onto polyester: 78%.

Comparably good results are obtained on transfer printing onto cellulose triacetate and polyamide fabrics.

I claim:

1. In an aqueous printing ink suitable for transfer printing wherein the ink contains a water-insoluble dyestuff which sublimes at 120°–280° C; a binder; a filler selected from the group consisting of quartz powder, natural calcium magnesium carbonate, and mixtures of the two; a thickener; an organic solvent; and a surface active agent; the improvement which comprises having the binder/filler weight ratio in the ink from 1:6 to 1:7.

2. The printing ink of claim 1 wherein said binder is an acrylate resin and said filler is a naturally occurring calcium magnesium carbonate.

* * * * *